(12) United States Patent
Ichikawa et al.

(10) Patent No.: US 7,336,431 B2
(45) Date of Patent: Feb. 26, 2008

(54) IMAGE READING DEVICE AND IMAGE FORMING DEVICE

(75) Inventors: Hirokazu Ichikawa, Kanagawa (JP); Fumio Nakaya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/399,363

(22) Filed: Apr. 7, 2006

(65) Prior Publication Data

US 2007/0091465 A1    Apr. 26, 2007

(30) Foreign Application Priority Data

Oct. 13, 2005    (JP)    ............................. 2005-299265
Oct. 21, 2005    (JP)    ............................. 2005-307416

(51) Int. Cl.
*G02B 17/00*    (2006.01)
(52) U.S. Cl. ...................... 359/726; 359/223; 359/226
(58) Field of Classification Search ................. 359/726
See application file for complete search history.

(56) References Cited

U.S. PATENT DOCUMENTS 3,986,771 A * 10/1976 Tsukada ..................... 399/178
4,952,035 A *  8/1990 Yuasa et al. ................ 359/241
6,589,233 B1 *  7/2003 Maki ........................... 606/17
2002/0051088 A1 *  5/2002 Ikeda et al. ................. 348/630
2005/0001900 A1 *  1/2005 Kreh et al. ................... 348/87

FOREIGN PATENT DOCUMENTS

| JP | 05072641 A * | 3/1993 |
| JP | A-05-333643 | 12/1993 |
| JP | A-06-70097 | 3/1994 |
| JP | A-05-313537 | 11/1996 |
| JP | A-2003-132350 | 5/2003 |
| JP | 2004274298 A * | 9/2004 |

* cited by examiner

*Primary Examiner*—Jessica T Stultz
(74) *Attorney, Agent, or Firm*—Morgan, Lewis & Bockius LLP

(57) ABSTRACT

A device includes a light source; a first guiding unit that guides the light from the light source to an object at prescribed incident angles including a first incident angle and a second incident angle; a signal generating unit that receives light and that generates an image signal based on the received light; a second guiding unit that guides the light reflected from the object to the signal generating unit; and a control unit that controls the first guiding unit to guide the light from the light source to the object at least two different incident angles including the first incident angle and the second incident angle, and controls the signal generating unit to generate image signals for the at least two different incident angles.

13 Claims, 11 Drawing Sheets

IMAGE READING DEVICE AND IMAGE FORMING DEVICE

This application claims the benefits of Japanese Patent Application No. 2005-299265 filed on Oct. 13, 2005 and Japanese Patent Application No. 2005-307416 filed on Oct. 21, 2005, which are hereby incorporated by reference.

BACKGROUND

1. Technical Field

The present invention relates to obtaining information on texture of an object, and in particular to obtaining information on glossiness and unevenness of an object.

2. Related Art

Surfaces of objects have many different textures as well as colors. Texture of an object includes glossiness and unevenness of the object. For example, a surface of a polished metal has a smooth and glossy texture, whereas a surface of cloth or fabric has a unique uneven texture caused by the warp and woof of the cloth or fabric.

FIG. 18 illustrates the nature of reflection of light from an object. It is generally understood that when light is impinged on a surface of an object at an incident angle θ1 and reflected from the object at a reflection angle θ2, the reflection angle θ2 is equal to the incident angle θ1 (Law of Reflection). However, in reality, light is not only reflected from the surface of an object at the reflection angle $\theta_2$ but is also reflected at other angles.

This is because a reflective plane (a surface of an object) is not always flat, and has a degree of unevenness. When a reflective plane has such unevenness, the light is reflected at various angles due to the unevenness.

In the present invention, "specular reflection" means a reflection of light from a macroscopic reflective plane with a reflection angle which is substantially equal to an incident angle, and "specularly reflected light" means light thus reflected; and "diffuse reflection" means all reflections of light from the macroscopic reflective plane other than the specular reflection, and "diffusely reflected light" means light thus reflected.

In the attached drawings, a symbol Lsr is added to a light path indicating specularly reflected light; and a symbol Ldr is added to a light path indicating diffusely reflected light, where it is necessary to distinguish them.

As for the glossiness of an object, it is known to be expressed in terms of the intensity ratio of the specularly reflected component to the diffusely reflected component in light reflected from the object. For example, the ratio is relatively high for light reflected from a surface of a polished metal. This is because a polished metal surface has highly glossy texture. In contrast, the ratio is relatively low for light diffusely reflected from an object having less glossiness, such as cloth or fabric. Thus, glossiness of an object may be read by measuring the ratio of the specularly reflected light to the diffusely reflected light in light reflected from the object.

However, the intensity of light specularly reflected from an object tends to exceed the dynamic range of image-input elements of general optical image-reading devices. Accordingly, optical guiding units are designed to minimize the reception of the specularly reflected light from an object, and thereby maximize the reception of the diffusely reflected light from the object. Since the reflected light received by a general optical image-reading device contains a large amount of diffusely reflected light in this design, the device is unable to read glossiness of an object appropriately.

To read the glossiness of an object, a configuration is required such that both diffusely reflected light and specularly reflected light from the object are received, and glossiness can be obtained based on reflection components in each. For example, by illuminating an object with a light source to read an image mainly containing diffusely reflected light (a diffuse reflection image) and then illuminating the object with a light source to read an image mainly containing specularly reflected light (a specular reflection image), it is possible to generate a glossiness signal which indicates glossiness based on these image signals.

As for the unevenness on an object, it appears as shadows on the object. Shadows are more readily appeared, when the incident angle of light becomes larger. For example, as shown in FIG. 19, light hitting a convex portion of an object at an incident angle of $\theta_{11}$ causes a shadow in a region S1. Further, light hitting the convex portion at an incident angle of $\theta_{12}$ ($>\theta_{11}$) causes a shadow in a region S2. As shown in the figure, the region S2 is larger than the region S1. Thereby the unevenness of an object appears more pronouncedly when the incident angle becomes larger.

Accordingly, to read the unevenness of an object, a configuration is needed in which reading is performed at two different incident angles: a first incident angle and a second (larger) incident angle. When the object is illuminated at the first incident angle, the light reflected from the object expresses colors mainly based on diffuse reflection components of the object. When the object is illuminated at the second incident angle, the light reflected from the object expresses unevenness mainly based on the convexity and concavity (unevenness) of the surface of the object. Accordingly, when an image is formed based on both of these reflected lights, both the color of the object and the unevenness of the surface can be reproduced.

As shown in the partial cross-section of the image-reading device shown in FIG. 20, a light source 611 for illuminating an object O at a first incident angle $\theta_{11}$ and a light source 612 for illuminating the object O at a second incident angle $\theta_{12}$ are required.

However, having a second light source in an image-reading device as described above requires more space and leads to increased costs. Accordingly, it is desirable to provide only one light source, moving it between the position 611 and the position 612 shown in FIG. 20. In this case, too, however, the light source is required to move vertically (between the top and the bottom of the image-reading device). Image-reading devices are often required to be designed as small as possible vertically. Accordingly, the need for vertical movement of the light source as described above is a problem.

Moreover, if the unevenness of the surface of the object is very slight, it may be insufficient to read the unevenness by simply illuminating at a pre-determined incident angle. In such a case, shadows of sufficient size does not appear unless the second incident angle is further increased. It is therefore preferable to provide three or more light sources and to use these light sources according to the unevenness of the surface of the object, in order to read the unevenness more clearly. However, there still exists the problem that finding space to install three or more light sources is extremely difficult in an image-reading device which is required to be as small as possible vertically as described above.

SUMMARY

According to an aspect of the present invention, a device is provided including a light source; a first guiding unit that guides the light from the light source to an object at prescribed incident angles including a first incident angle and a second incident angle; a signal generating unit that receives light and that generates an image signal based on the received light; a second guiding unit that guides the light reflected from the object to the signal generating unit; and a control unit that controls the first guiding unit to guide the light from the light source to the object at least two different incident angles including the first incident angle and the second incident angle, and controls the signal generating unit to generate image signals for the at least two different incident angles.

BRIEF DESCRIPTION OF THE DRAWINGS

Exemplary embodiment(s) of the present invention will be described in detail based on the following figures, wherein.

DETAILED DESCRIPTION

A. First Exemplary Embodiment

A-1. Image-Forming Device

Figure 1:
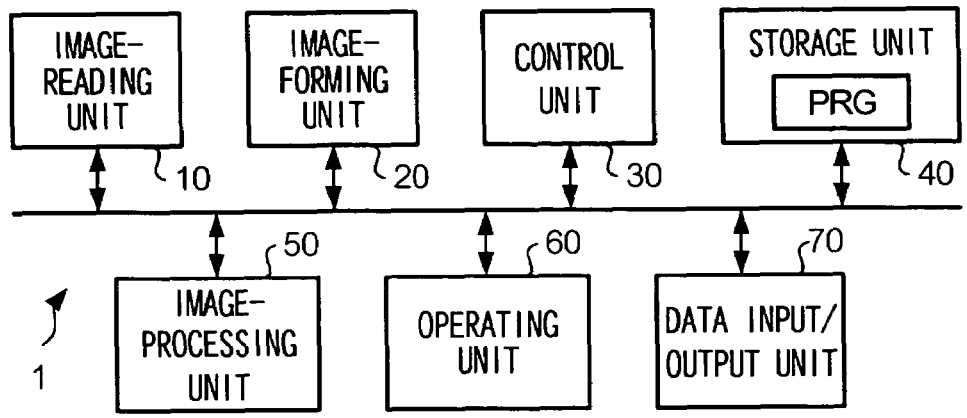
FIG. 1 is a functional block diagram of an image-forming device according to a first exemplary embodiment of the present invention.

FIG. 1 is a functional block diagram of an image-forming device 1 according to the first exemplary embodiment of the present invention. The image-forming device 1 has an image-reading unit 10, an image-forming unit 20, a control unit 30, a storage unit 40, an image-processing unit 50, an operating unit 60, and a data input/output unit 70. The control unit 30 is a computing device provided with a CPU (Central Processing Unit), a RAM (Random Access Memory), a ROM (Read Only Memory), and so on, which are not shown, and controls operations of various units of the image-forming device 1 by executing programs stored in the storage unit 40. The storage unit 40 is configured as a large-capacity storage device such as a HDD (Hard Disk Drive), and stores the programs.

The image-reading unit 10 optically reads a surface of an object such as paper or fabric, and generates and outputs image signals according to the texture of the surface. The image-processing unit 50 has plural image-processing circuits such as ASICs (Application Specific Integrated Circuits) or an LSIs (Large Scale Integrated Circuits), image memory for temporarily storing image data, and so on, and each image-processing circuit executes various image processes. Specifically, the image-processing unit 50 performs prescribed image processings and generates image data based on the image signals generated by the image-reading unit 10, and outputs the image data to the image-forming unit 20. The image-forming unit 20 forms a toner image on a recording sheet such as recording paper, based on the image data. The operating unit 60 is provided with a touch-panel display, various buttons, and so on, accepts input instructions from an operator, and supplies the input instructions to the control unit 30. The data input/output unit 70 is an interface device for transmitting data back and forth with external devices.

Figure 2:
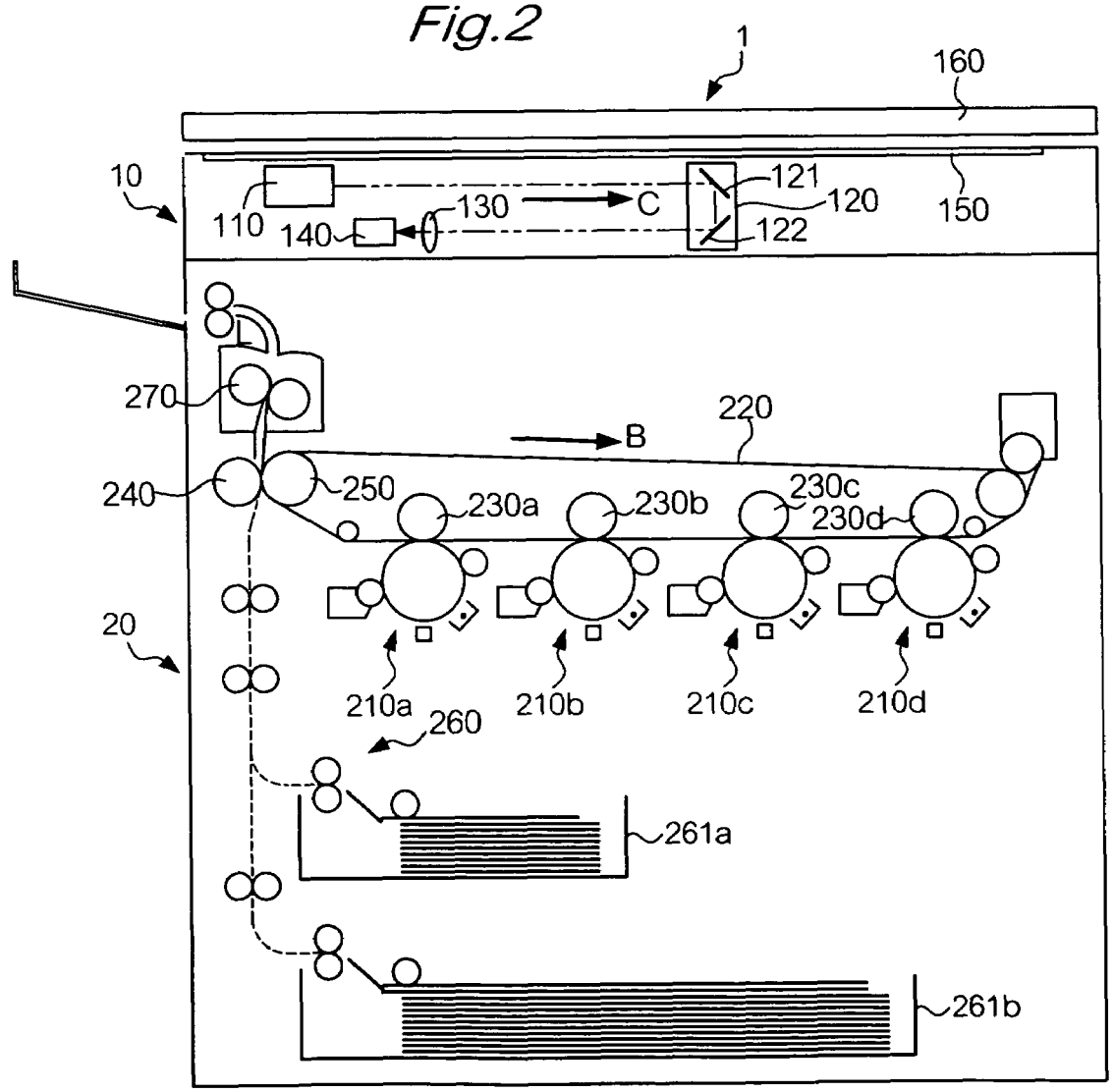
FIG. 2 is a view showing a device configuration of the image-forming device.

FIG. 2 is a view showing a configuration of the image-forming device 1.

The image-reading unit 10 has a full-rate carriage unit 110, a half-rate carriage unit 120, a focusing lens 130, an inline sensor 140, a platen glass 150, and a platen cover 160. The full-rate carriage unit 110 optically reads a surface of an object O, while being moved by a driving unit such as a motor (not shown) at a velocity v in the direction of the arrow C (the main scanning direction). The half-rate carriage unit 120 has mirrors 121 and 122, and guides light from the full-rate carriage unit 110 to the focusing lens 130. The half-rate carriage unit 120 is moved by a driving unit such as a motor (not shown) in the same direction (the scanning direction) as the full-rate carriage unit 110 at half the velocity of the full-rate carriage unit 110 (i.e., v/2).

The focusing lens 130 is disposed along a light path, which connects the mirror 122 and the inline sensor 140, and images reflected light from the object O at a light-receiving position of the inline sensor 140. The focusing lens 130 is made up of, for example, between four and eight combined lenses, in accordance with a required level of performance.

In this exemplary embodiment, mirrors, lenses, and so on disposed along a light path of reflected light are collectively called the "guiding unit."

The inline sensor 140 is a signal generating unit that receives imaged light and generates and outputs image signals in accordance with the received light, and is, for example, multiple rows of CCD linear image sensors (image-input elements) provided with an on-chip color filter. In this exemplary embodiment, image sensors are used which can input images in three colors: B (blue), G (green), and R (red). The inline sensor 140 outputs image signals of these three colors.

The platen glass 150, on which the object O is placed, is a flat and transparent glass panel. A reflection-suppressing layer, such as a multilayer dielectric film is formed on both sides of the platen glass 150, thus reducing reflection on the surfaces of the platen glass 150. The platen cover 160 is disposed to cover the platen glass 150 for shutting off outside light and allowing easier reading the object O placed on the platen glass 150.

Thus configured, in the image-reading unit 10, the full-rate carriage unit 110 illuminates the object O placed on the platen glass 150, and reflected light from the object O is received by the inline sensor 140 via the mirrors 121 and 122. The inline sensor 140 generates image signals in three colors, B (blue), G (green), and R (red) and outputs them to the image-processing unit 50 in response to the reflected light it received. The image-processing unit 50 generates and supplies to the image-forming unit 20 image data which has undergone shading correction, color correction, and a variety of other correcting and computing processes based on the image signals.

A-2. Full-Rate Carriage Unit

Figure 3:
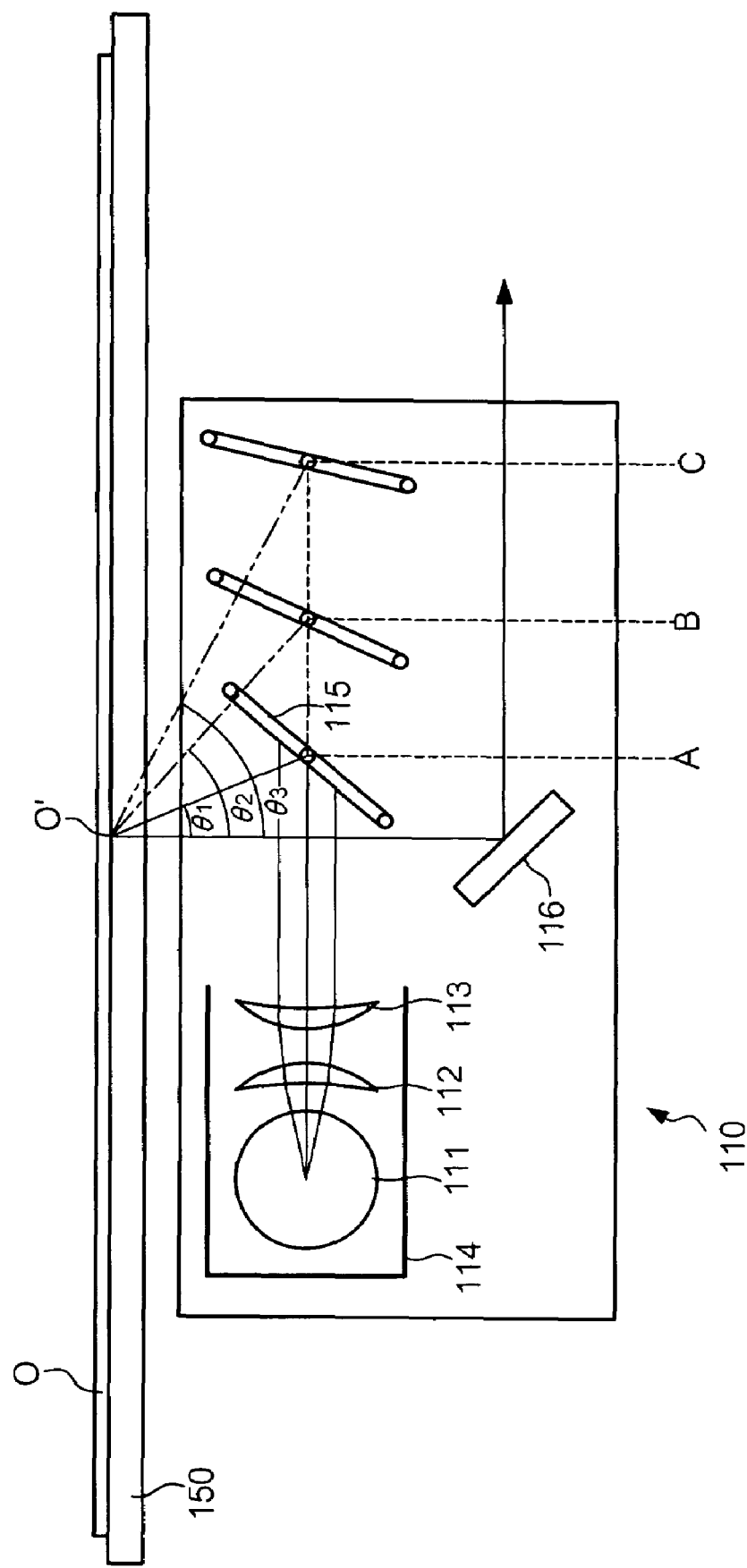
FIG. 3 is a view showing a configuration of a full-rate carriage unit of the image-forming device.

FIG. 3 is a view showing details of the full-rate carriage unit 110. As shown in FIG. 3, the full-rate carriage unit 110 has a tubular light source 111, two cylindrical convex lenses 112 and 113, a cover 114, a moving-mirror 115, and a fixed mirror 116. The tubular light source 111 is a halogen lamp or a xenon fluorescent lamp, for example. The pair of the cylindrical convex lenses 112 and 113, which are disposed in a manner that their convex surfaces oppose each other, transform the light from the tubular light source 111 to an approximately parallel light. The cover 114 covers up the tubular light source 111 and the cylindrical convex lenses 112 and 113 so as to keep the light from leaking out.

The moving-mirror 115 has a reflective surface which reflects the light from the tubular light source 111 in the direction of the object O. The light is further reflected from the object O. The fixed mirror 116 reflects the reflected light from the object O in a direction toward the half-rate carriage unit 120. The moving-mirror 115 is configured such that the orientation and the horizontal position (in the main scanning direction) of the moving-mirror 115 may be varied in the figure. There exists, however, a fixed relationship between the orientation and the position of the moving-mirror 115. Specifically, even if the orientation of the moving-mirror 115 changes, if the full-rate carriage unit 110 is in a position determined ahead of time (for example, a scanning start position), the moving-mirror 115 is configured to move to a position at which light reflected by a reflective surface of the moving-mirror 115 illuminates a fixed position on the object O.

As shown in the example in FIG. 3, even in a case in which the orientation of the moving-mirror 115 is changed and the incident angle with respect to the object O changes, a configuration is adopted in which the scanning direction position of the moving-mirror 115 is changed in accordance with different incident angles so that light is always irradiated on a fixed position O' on the object. Specifically, the incident angle of the light with respect to the object O is $\theta_1$ when the moving-mirror 115 is disposed at a position A, $\theta_2$ when the moving-mirror 115 is disposed at a position B, and $\theta_3$ when the moving-mirror 115 is disposed at a position C ($\theta_1 < \theta_2 < \theta_3$). In other words, the greater the incident angle becomes as the orientation of the moving-mirror 115 changes, the further the position of the moving-mirror 115 is changed towards a position further separated from the light source 111. The reason the irradiation position on the object O is maintained fixed even if the incident angle is changed is that when the irradiation position on the object O moves in response to a change in the incident angle, the position of the full-rate carriage unit 110 itself has to be adjusted to be at the prescribed scanning start position by being moved in the main scanning direction when scanning begins.

Since the incident angle with respect to the object O is made variable by changing of the orientation of the moving-mirror 115, an image can be achieved which expresses both the color and the surface texture of the object O by for example irradiation of light on the object O at a first incident angle during a first scan, irradiation of light on the object O at a second incident angle which is larger than the first incident angle during a second scan, and generation of an image on a recording sheet based on the image signals achieved by the inline sensor 140 by each scan.

An adjusting unit for adjusting the orientation of the moving-mirror 115 and the position of the moving-mirror 115 along the scan direction is described next.

Figure 4:
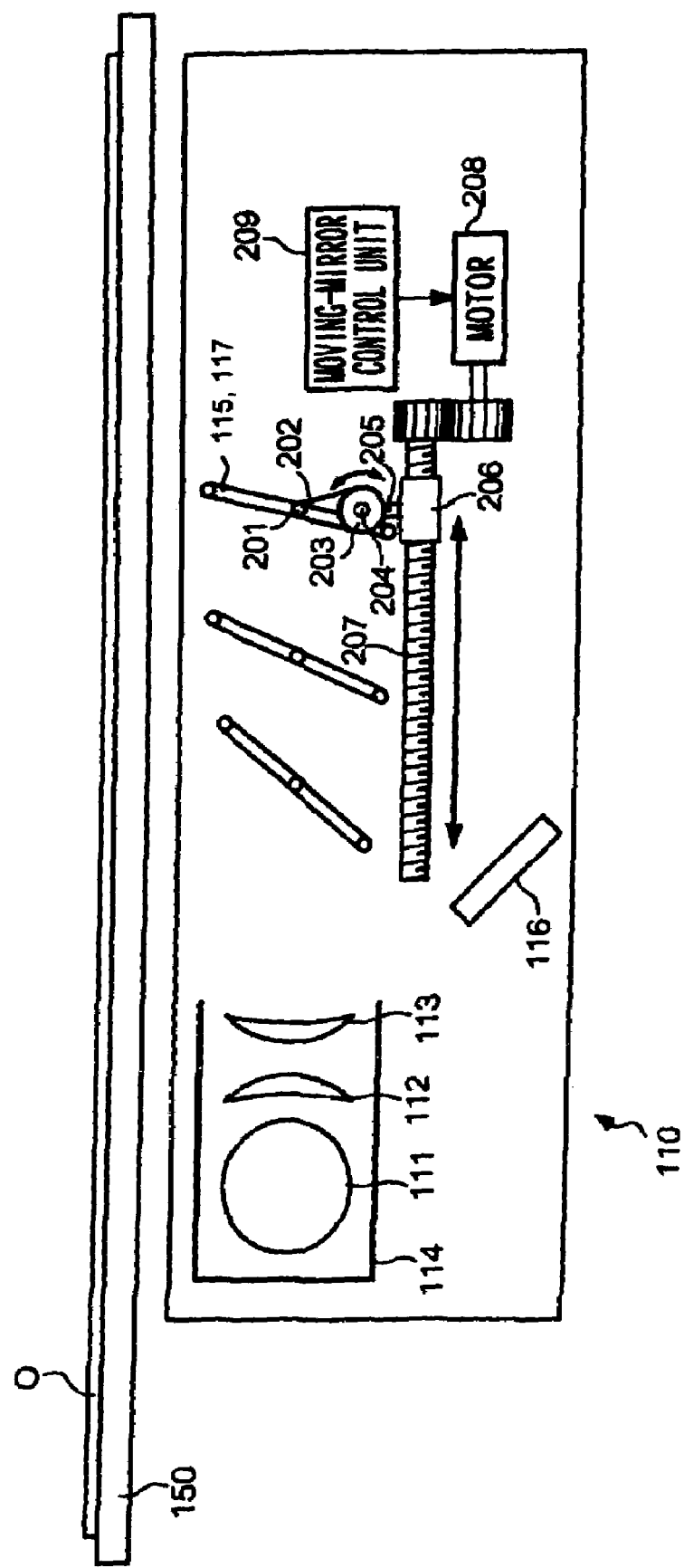
FIG. 4 is a view showing an example of a configuration of a drive system of the full-rate carriage unit.

FIG. 4 shows an example of this adjusting unit. The full-rate carriage unit 110 shown in FIG. 4 has a first driving unit that rotates the moving-mirror 115 and a second driving unit that moves the moving-mirror 115 in a direction perpendicular to the main scanning direction (hereinafter referred to as a sub-scanning direction).

A configuration of the first driving unit is described next. The moving-mirror 115 is secured to a moving-mirror holder 117, and the moving-mirror holder 117 has a shaft 201 which extends in a perpendicular direction to the surface of the paper of FIG. 4 parallel with the reflective surface. The shaft 201 is inserted into a hole provided to a casing member (not shown) of the full-rate carriage unit 110, and is rotatably supported. A belt 202 spans the shaft 201. When a roll 203, around which the belt 202 is tightly positioned, is rotated around a rotating shaft 204 by a motor (not shown) the moving-mirror holder 117 is also rotated around the shaft 201 due to this rotating operation. In this way, the orientation of the moving-mirror 115 is varied.

A configuration of the second driving unit is described next. The rotating shaft 204 is supported by a supporting member 205 affixed to a stage 206. A hole (not shown) with grooves on its inner surface is provided to the stage 206. Grooves which mesh with the grooves in the hole are formed on the outer circumference of a shaft 207. When the shaft 207 is rotated by the motor 208, the stage 206 moves horizontally in the figure (in the sub-scanning direction) due to this rotating operation. The moving-mirror holder 117 on the stage thereby moves in the sub-scanning direction.

The image-reading unit 10 operates in two modes: a first mode for obtaining the colors of the object O; and a second mode for obtaining the texture of the object O. The moving-mirror control unit 209 switches the incident angle to the object O for each mode. For example, in the first mode, the object O is illuminated at an incident angle of 45° and in the second mode, the object O is illuminated at an incident angle of 65°. Specifically, the moving-mirror control unit 209 associates and stores, for each mode, an incident angle, a position and an orientation of the moving-mirror 115 in the sub-scanning direction for realization of that incident angle. When the control unit 30 determines an incident angle by specifying the mode with either the first mode or the second mode, the moving-mirror control unit 209 controls the motor 208 to drive the roll 203 so that the moving-mirror 115 is positioned at the position and in the orientation to achieve the incident angle.

Figure 5:
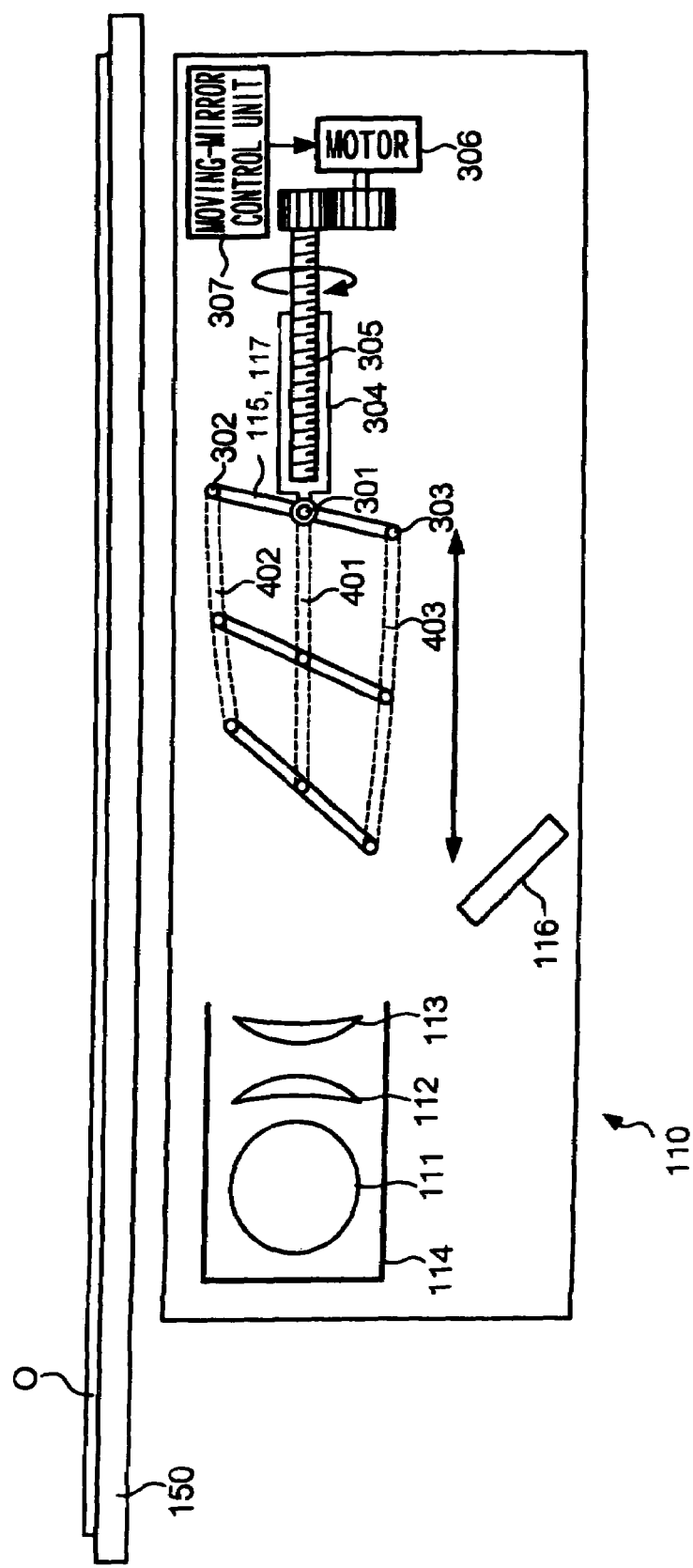
FIG. 5 is a view showing an example of a configuration of the drive system of the full-rate carriage unit.

Next, FIG. 5 is a view showing another example of the adjusting unit.

As shown in FIG. 5, the moving-mirror 115 is secured to the moving-mirror holder 117, a single shaft 301 is provided to the moving-mirror holder 117, and two protruding pins 302 and 303 are provided to the lateral surfaces. Specifically, the pin 302 is provided adjacent to the top edge of the moving-mirror holder 117, the pin 303 is provided adjacent to the bottom edge, and the shaft 301 is provided near the center. Guide grooves 401, 402, and 403, in which the shaft 301 and the pins 302 and 303 are respectively inserted, are provided to the casing member of the full-rate carriage unit 110. Since the orientation of the flat surface (reflective surface) is determined by two lines on the flat surface, when the shaft 301 and the pins 302 and 303 are inserted into the guide grooves 401, 402, and 403, and the moving-mirror holder 117 is secured at a certain position, the orientation of the moving-mirror 115 is uniquely determined.

The guide grooves 401, 402, and 403 extend in different directions, as shown in the figure, whereby the position of the moving-mirror holder 117 the orientation of the moving-mirror holder 117 are continuously varied. Furthermore, the directions of the guide grooves 401, 402, and 403 are determined such that the moving-mirror 115 is disposed at a position at which the object O is illuminated at a constant position, even if the orientation of the moving-mirror holder 117 is changed.

The shaft 301 is rotatably supported by a supporting member 304. A hole with grooves on its -inner surface is provided to the supporting member 304. Grooves which mesh with the grooves in the hole are formed on the outer circumference of a shaft 305. When the shaft 305 is rotated by the motor 306, the supporting member 304 moves horizontally in the figure (in the sub-scanning direction) due to this rotating operation.

When the orientation of the moving-mirror 115 is determined as described above, the position of the moving-mirror 115 is also uniquely determined. Accordingly, the moving-mirror control unit 307 associates and stores incident angles for each mode (i.e., the orientation of the moving-mirror 115), and positions of the moving-mirror 115 in the sub-scanning direction, in order to realize those incident angles, and when the reading mode is specified and the incident angle is determined, the moving-mirror control unit 307 drives the motor 306 so that the moving-mirror 115 is at a position at which the incident angle is achieved.

A-3. Generation of Image Data

As described above, the full-rate carriage unit 110 lights the object O and obtains information from the object O. Hereafter, this operation is referred as a "scanning operation." More particularly, when the object O is illuminated at an incident angle of 45°, the operation is referred as a "scanning operation at an incident angle of 45°," whereas when the object O is illuminated at an incident angle of 65°, the operation is referred as a "scanning operation at an incident angle of 65°."

The image-reading unit 10 executes two types of scanning operations: in the first reading mode, each of the scanning operation at an incident angle of 45° and the scanning operation at an incident angle of 65° in the second reading mode, composes the image signals achieved by the scanning operation, and generates image data. The image data achieved in this manner expresses the color and texture of the object O. The following description uses "fabric" as an example of the object O.

Figure 6:
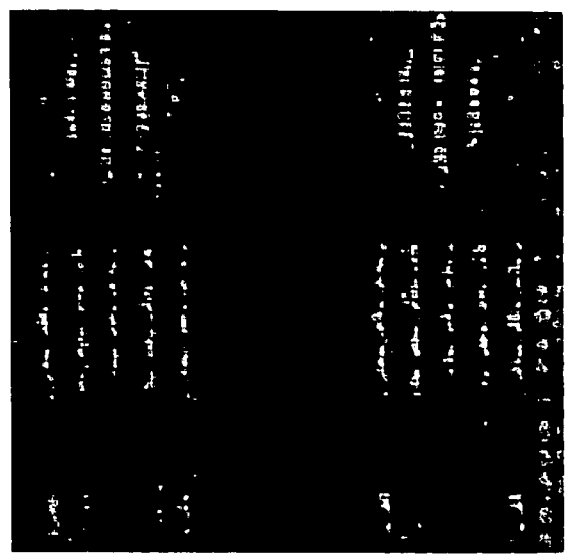
FIG. 6 is a view showing an input image achieved through a scanning operation at an incident angle of 45° with respect to an object (fabric)

First, FIG. 6 shows an input image P45 achieved by the scanning operation at an incident angle of 45° in the first reading mode performed on the object O (fabric). The input image P45 is expressed by colors, and clearly expresses the colors (patterns) of the object O. In other words, an incident angle of 45° can be called appropriate for reading the colors and patterns of the object O.

Figure 7:
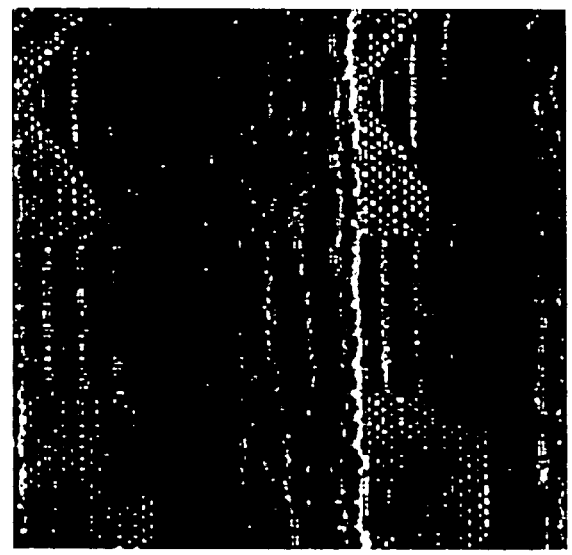
FIG. 7 is a view showing an input image achieved through a scanning operation at an incident angle of 65° with respect to the above object.
Figure 19:
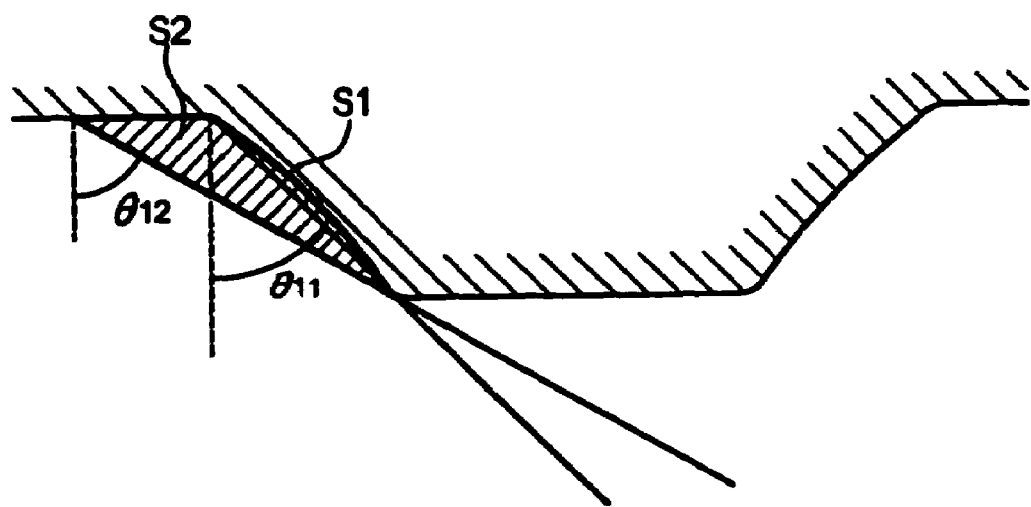
FIG. 19 is a view showing the relationship between incident angles and shadows on an object.
Figure 20:
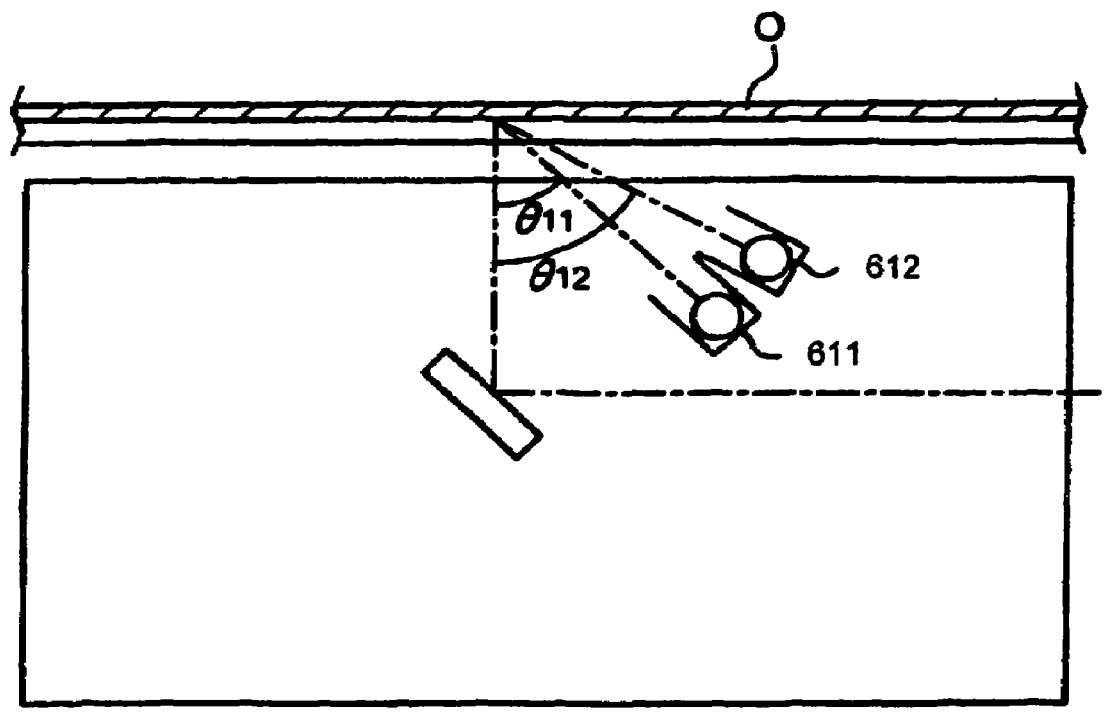
FIG. 20 is a view showing a configuration example of a full-rate carriage unit with two light sources.

Next, FIG. 7 shows an input image P65 achieved by the scanning operation at an incident angle of 65° in the second reading mode performed on the above object O (fabric). The input image P65 is a monochrome image made up of no colors. As can be seen from comparing the input image P65 with the input image P45 shown in FIG. 6, black regions are present on the object O in the input image P65. These black regions are shadows created by light irradiated on the object O because of the presence of convexities and concavities on the object O. In other words, as described using FIG. 19, since the incident angle $\theta_{12}$=approximately 65° is larger than the incident angle $\theta_{11}$=45° of the light source 111, more shadows are generated by the convexities and concavities on the surface of the object O. It can therefore be said that performing the scanning operation with a larger incident angle is more appropriate for reading the convexities and concavities (i.e., texture) of the object O. However, if the incident angle is raised above 80°, the areas of shadow due to slightly larger convexities and concavities on the object O become extremely large, resulting in a loss of detailed texture information. Furthermore, excessively increasing the incident angle causes a problem that the amount of irradiated light from the light source irradiated per unit area of the surface of the object O drops significantly. Accordingly, when reading texture, an incident angle of between 60° and 70° is appropriate.

Figure 8:
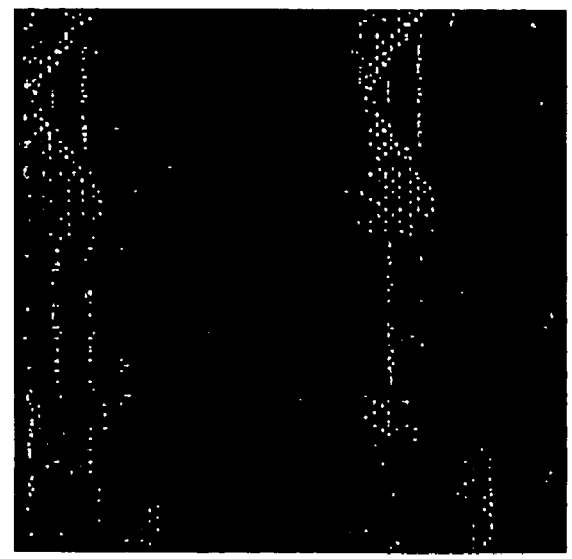
FIG. 8 is a view showing a composite image in which the input image achieved through the scanning operation at an incident angle of 45° and the input image achieved through the scanning operation at an incident angle of 65° have been composed.

FIG. 8 is a view showing a composite image P in which the input image P45 of FIG. 6 and the input image P65 of FIG. 7 are composed. As described above, the input image P45 clearly expresses the colors of the object O and the input image P65 expresses the texture of the object O, so the composite image P can be said to express both the colors and the texture of the object O.

A specific method for generating image data is as follows.

First, the image-reading unit 10 executes the scanning operation at an incident angle of 45° in the first reading mode. Specifically, the moving-mirror control unit 209 on the full-rate carriage unit 110 adjusts the moving-mirror 115 to a position and orientation such that the incident angle with respect to the object O is 45°. When this adjustment is finished, the full-rate carriage unit 110 is moved in the direction shown by the arrow C in FIG. 2, while light is being radiated from the tubular light source 111. The entire surface of the object O is thus optically scanned and the reflected light is read by the inline sensor 140. The image-processing unit 50 obtains an image signal (a first image signal) based on the diffusely reflected light from the inline sensor 140. The signal value of the first image signal is stored in an image memory in the image-processing unit 50.

Next, the image-reading unit 10 executes the scanning operation at an incident angle of 65°. Specifically, the moving-mirror control unit 209 on the full-rate carriage unit 110 adjusts the moving-mirror 115 to a position and orientation such that the incident angle is 65°. When this adjustment is finished, the full-rate carriage unit 110 is moved in the direction shown by the arrow C in FIG. 2 while light is being radiated from the tubular light source 111. The entire surface of the object O is thus optically scanned and the reflected light is read by the inline sensor 140. By this process, the image-processing unit 50 obtains from the inline sensor 140 an image signal (a second image signal) based on the diffusely reflected light. The signal value of the second image signal is stored in an image memory in the image-processing unit 50.

Next, the image-processing unit 50 reads the signal value of the second image signal from the image memory, converts this into a signal value expressing a monochrome image (with no color), and multiplies the signal value by a coefficient C ($0<C\leqq 1$). The coefficient C is stored in the image-processing unit 50. The larger the coefficient C is, the more emphasized the shadows are on the surface of the object. In other words, because the coefficient C works as a weight with regard to texture expressed by the second image signal, the image-processing unit 50 can adjust the balance of the texture relative to the color of the object O by adjusting the coefficient C.

Next, the image-processing unit 50 reads the signal value of the first image signal from the image memory and adds the product of the signal value of the second image signal and the coefficient to the signal value of the first image signal, thereby composing the two images. The image-processing unit 50 implements the prescribed image processes on the signal values thus obtained, and obtains composite image data expressing composite image P which is to be finally output. Color image data is thereby generated which expresses an image in which a color image based on the first image signal is superimposed on a monochrome image based on the second image signal.

Note that either of the scanning operation at an incident angle of 45° or the scanning operation at an incident angle of 65°, which are described above, can be executed first.

Once the image-processing unit 50 generates image data by the procedure described above, the image-forming unit 20 forms an image on the recording sheet based on the image data. Now, a configuration of the image-forming unit 20 is described, with reference once again to FIG. 2. As shown in FIG. 2, the image-forming unit 20 has image-forming units 210a, 210b, 210c, and 210d, which correspond to colors Y (yellow), M (magenta), C (cyan), and K (black), respectively, an intermediate image transferring belt 220, primary image transferring rolls 230a, 230b, 230c, and 230d, a secondary image transferring roll 240, a back-up roll 250, a paper feed unit 260, and a fusing unit 270. The intermediate image transferring belt 220 is an endless belt member, and is moved in the direction of the arrow B in the figure by a driving unit (not shown). The primary image transferring rolls 230a, 230b, 230c, and 230d are biased toward the side of photosensitive drums on the image-forming units 210a, 210b, 210c, and 210d via the intermediate image transferring belt 220. Toner images of the colors Y, M, C, and K based on the image data are formed on these photosensitive drums, and the toner images are transferred to the intermediate image transferring belt 220. The secondary image transferring roll 240 and the back-up roll 250 are mutually biased at a position at which the intermediate image transferring belt 220 is opposed to recording paper, and transfer the toner image from the intermediate image transferring belt 220 to the recording paper. The paper feed unit 260 has paper trays 261a and 261b which hold the recording paper and feed the recording paper during image formation. The fusing unit 270 has a roll member for heating and applying pressure to the recording paper, fusing the toner image transferred to the surface of the recording paper with heat and pressure. The image-forming unit 20 thereby forms an image on the recording paper based on the image data supplied by the image-processing unit 50.

According to this exemplary embodiment, by varying the position and orientation of the moving-mirror 115 which reflects light from the tubular light source 111, the incident angle with respect to the object O can be adjusted to any value, even with a single light source. In this case, the moving direction of the moving-mirror 115 is the scanning direction (horizontal direction), so there is no need to ensure a large vertical space in the image-forming device (especially in an image-reading device).

The image-forming device 1 generates image data by composing the first image signal achieved by light reflected due to light irradiated on the object O at an incident angle of 45° and the second image signal achieved by light reflected due to light irradiated on the object O at an incident angle of 65°, which is larger than the incident angle of 45°. The first image signal achieved by light at an incident angle of 45° is an image signal mainly for detecting the colors of the object O, and the second image signal achieved by light at an incident angle of 65° is an image signal mainly for detected the texture of the object O. Accordingly, image data achieved by composing the first image signal and the second image signal is image data which expresses the color and the texture of the object O. Forming an image based on this image data makes it possible to faithfully reproduce the colors and texture of the object O.

B. Second Exemplary Embodiment

Figure 9:
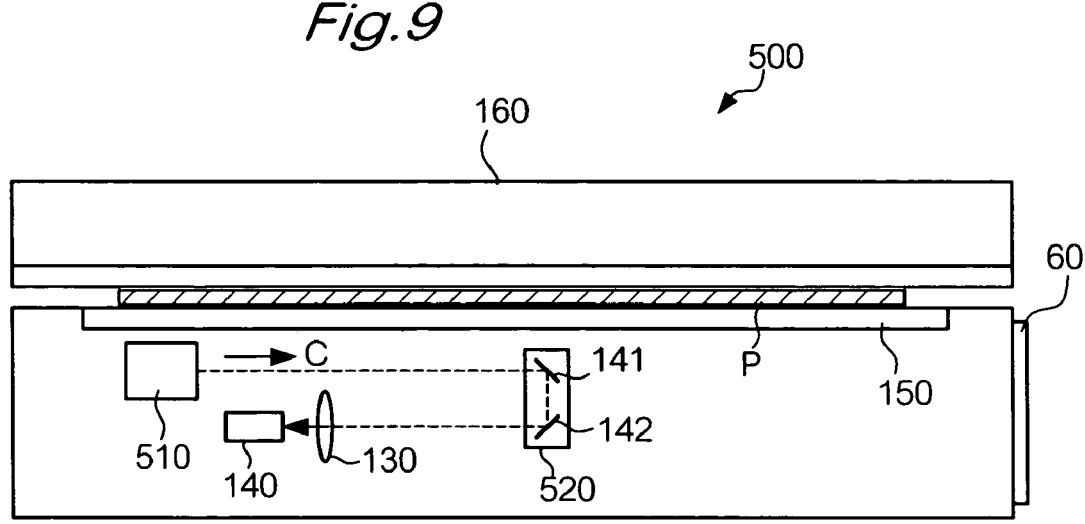
FIG. 9 is a view showing a device configuration of an image-reading device according to a second exemplary embodiment of the present invention.

FIG. 9 is a view showing a device configuration of an image-reading device 500 according to a second exemplary embodiment of the present invention. As shown in the figure, the image-reading device 500 has a platen glass 150, a platen cover 160, a full-rate carriage unit 510, a half-rate carriage unit 120, a focusing lens 130, an inline sensor 140, and an operating unit 60.

The platen glass 150 is a transparent glass panel, on which an object O is placed. A reflection-suppressing layer, such as, for example, a multilayer dielectric film, is formed on both sides of the platen glass 150, thus reducing reflection on the surfaces of the platen glass 150. The platen cover 160 is disposed such that it covers the platen glass 150, blocking outside light and making easier reading the object O which is placed on the platen glass 150. Note that in the present invention, the object O is not limited to paper, but may be plastic, metal, cloth, or fabric.

Figure 10:
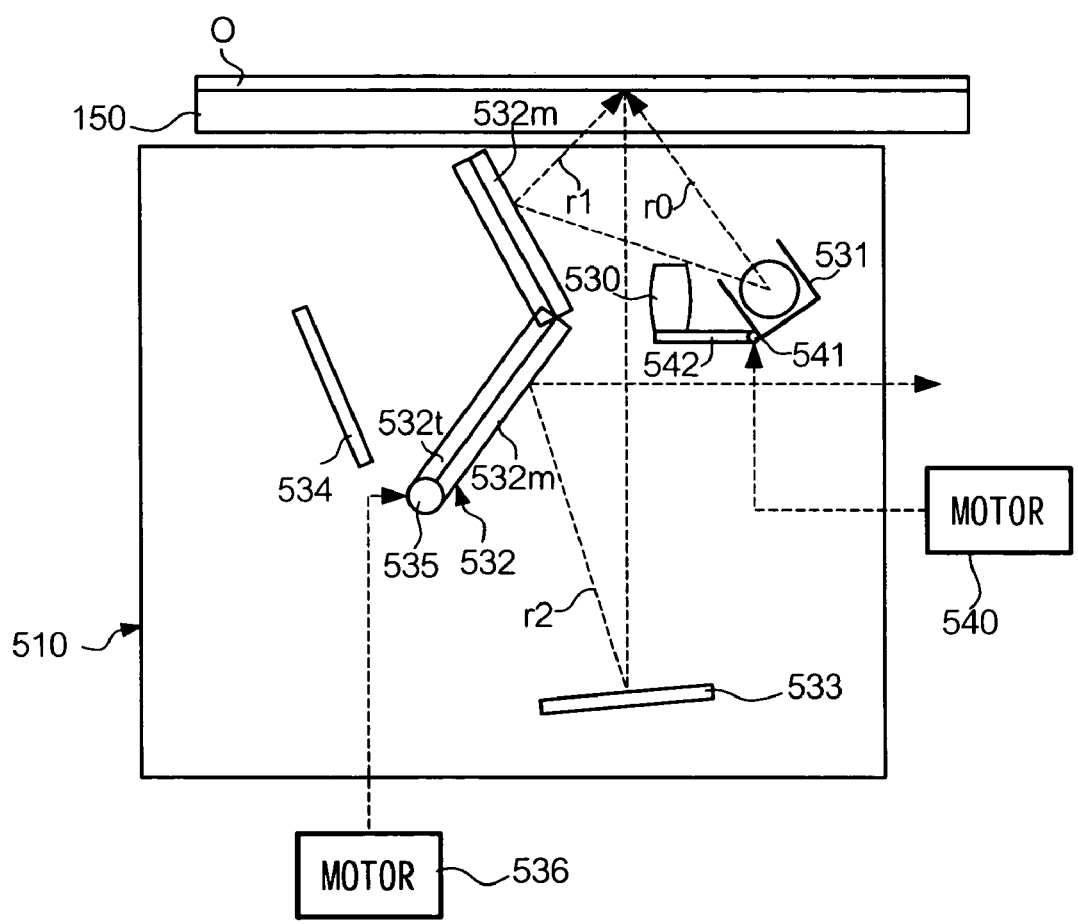
FIG. 10 is a view showing another configuration of the full-rate carriage unit according to the same exemplary embodiment.
Figure 11:
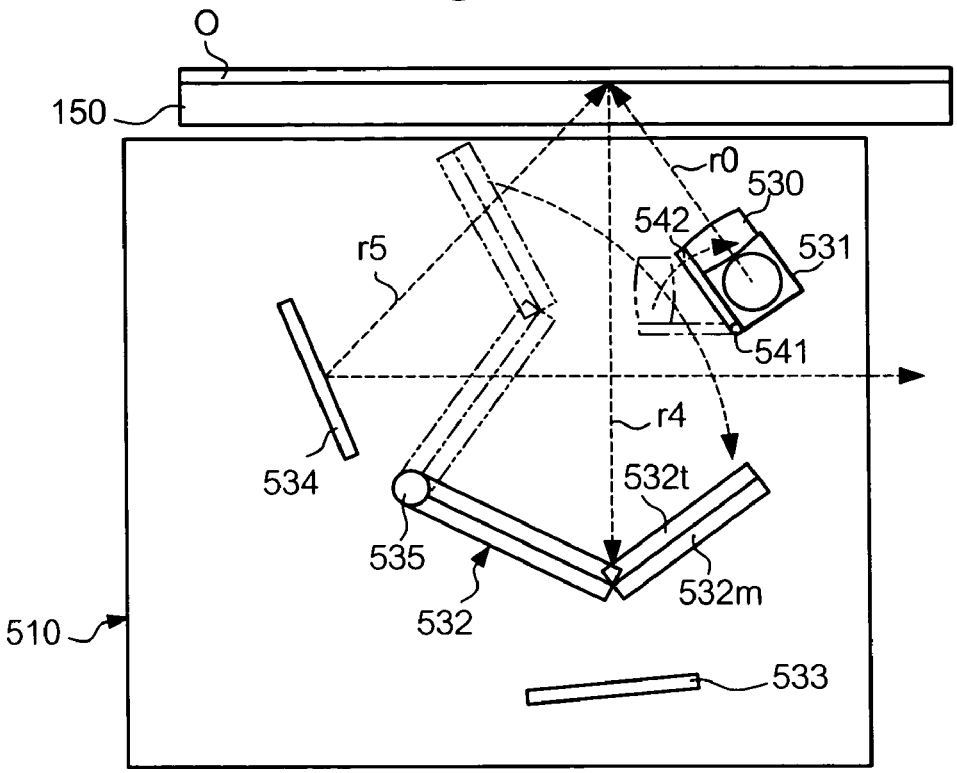
FIG. 11 is a view showing another configuration of the full-rate carriage unit according to the same exemplary embodiment.

FIG. 10 and FIG. 11 are views showing details of the full-rate carriage unit 510.

The image-reading modes of the image-reading device 500 are a color reading mode mainly for reading the colors of the object (a first image-reading mode) and a texture reading mode mainly for reading the texture or glossiness of the object (a second image-reading mode). FIG. 10 shows a configuration of the full-rate carriage unit 510 in the color reading mode and FIG. 11 shows a configuration of the full-rate carriage unit 510 in the texture reading mode. Note that in the full-rate carriage unit 510 of this exemplary embodiment, the incident angle of light from a tubular light source 531 with respect to the object is approximately 45°, and light reflected at a reflection angle of approximately 45° with respect to this light is specularly reflected light. More specifically, the reflected light contains diffusely reflected light in addition to the specularly reflected light, but components in the reflected light which are equivalent to the diffusely reflected light should be diminished by implementation of prescribed operations on the image signal generated based on the light. On the other hand, as with ordinary image-reading devices which only read the colors of the object O, light reflected at a reflection angle of approximately 0° with respect to the light hitting the object O is diffusely reflected light.

The full-rate carriage unit 510 has a tubular light source 531, a collimator lens 530, a movable reflector 532, and mirrors 533 and 534. The tubular light source 531 is a halogen lamp or a xenon fluorescent lamp, for example, and is provided at a position at which light is irradiated in the direction of the object O, as shown in the figure. The collimator lens 530 is a guiding unit (a first guiding unit), which transforms the light emitting from the tubular light source 531 (diffuse light) to a parallel light and guides the parallel light to the object O. The collimator lens 530 is secured to a supporting member 542, which rotates around a shaft 541. When the supporting member 542 is rotated around the shaft 541 by a motor 540 (a first driving unit), the collimator lens 530 can be positioned as shown in FIG. 10 and as shown in FIG. 11. (Note that the motor 540 is omitted from FIGS. 11 to 16, which are discussed below.)

When the collimator lens 530 is in the position shown in FIG. 10 in the color reading mode, the object O is illuminated with the diffuse light from the tubular light source 531. Diffuse light is convenient for reading the colors of the object O. When the collimator lens 530 is in the position shown in FIG. 11 in the texture-reading mode, the light from the tubular light source 531 is emitted in the direction of the object O after being converted to parallel light by the collimator 530. When parallel light lights the object O, the incident angle of the light beam with respect to the object becomes uniform, which makes it possible more quantitatively to generate specularly reflected light components by the fine shape of the surface of the object. The texture of the object can, as a result, be read more accurately. The light (diffuse light) from the tubular light source 531 is condensed into parallel light, achieving the effect of being able to ensure a sufficient amount of light.

The movable reflector 532 works as a guiding unit (a second guiding unit), and is formed in a shape of an angled bracket (<), or in a shape of a line which has been bent in the middle. The movable reflector 532 is rotated around a shaft 535 by a motor 536 (a second driving unit), and can take the orientation shown in FIG. 10 and the orientation shown in FIG. 11. (Note that the motor 536 is omitted from FIG. 11 and FIG. 12 to FIG. 16, which are discussed below.) The movable reflector 532 has a reflective surface 532m for reflecting light and an absorbing surface 532t for absorbing light. The absorbing surface 532t is a so-called light trap, such as, for example, a black porous polyurethane sheet, and the majority of light entering it is trapped by the surface and is absorbed.

The mirrors 533 and 534 work as guiding units which further reflect the reflected light from the object O and direct this light to the half-rate carriage unit 120. More specifically, in the color reading mode, the mirror 533 (a first guiding unit) guides the diffusely reflected light from the object O to the direction of the half-rate carriage unit 120. In the texture reading mode, on the contrary, the mirror 534 (a second guiding unit) guides the specularly reflected light from the object O to the direction of the half-rate carriage unit 120.

In the color reading mode, when the movable reflector 532 is positioned as shown in FIG. 10, it reflects the light from the tubular light source 531 in the direction of the object O with the reflective surface 532m, as shown by the dotted line r1. At the same time, the object O is irradiated by direct light from the tubular light source 531 as shown by the dotted line r0, with the result of being simultaneously irradiated from two directions (dotted lines r0 and r1). As shown by the dotted line r2, the diffusely reflected light from the object O is further reflected by the reflective surface 532m of the movable reflector 532 after being reflected by the mirror 533, and is thereby directed in the direction of the half-rate carriage unit 120. In other words, the orientation of the movable reflector 532 in the color reading mode is an orientation in which light from the tubular light source 531 is reflected in a direction toward the object O by the reflective surface 532m, and also in which the diffusely reflected light from the object O is directed toward the half-rate carriage unit 120 by being reflecting by the mirror 533.

In the texture reading mode when the movable reflector 532 is positioned as shown in FIG. 11, the reflective surface 532m moves to a position at which light from the tubular light source 531 is not received, so the object O is only irradiated from the direction of the tubular light source 531 (i.e., from a constant direction). Accordingly, this light is specularly reflected light by the fine shape of the surface of the object O, and therefore light expressing the texture of the object. This specularly reflected light is reflected by the mirror 534, and directed in the direction of the half-rate carriage unit 120, as shown by the dotted line r5. Further, the absorbing surface 532t of the movable reflector 532 moves to a position at which it faces the object O, so the diffusely reflected light from the object O is absorbed by the absorbing surface 532t, as shown by the dotted line r4. Thus, the orientation of the movable reflector 532 in the texture reading mode is a orientation in which light from the tubular light source 531 is diffusely reflected by the object O and directed in the direction of the absorbing surface 532t, and also in which the specularly reflected light from the object O is directed toward the half-rate carriage unit 120 by the mirror 534.

When switching between the color reading mode and the texture reading mode, the movable reflector 532 and the collimator lens 530 need to be moved in such a way that they do not collide. For example, when transitioning from the color reading mode in FIG. 10 to the texture reading mode in FIG. 11, first the movable reflector 532 should be turned to the position shown in FIG. 11 and then the collimator lens 530 should be moved to the position shown in FIG. 11.

Note that in connection with the orientation of the movable reflector 532 and the positions of the members 532 through 534, the length of the optical path of the light which is diffusely reflected by the surface of the object O until being received by the inline sensor 140 via the mirror 533 and the movable reflector 532, is equal to the length of the optical path of the light which is specularly reflected by the surface of the object O until being received by the inline sensor 140 via the mirror 534. Accordingly, even if the orientation of the movable reflector 532 changes in accordance with the image-reading mode, the focus position in the guiding units does not change. This configuration makes it possible to receive diffusely reflected light and specularly reflected light at the same inline sensor 140 (a signal generating unit) without adjusting the focal position each time.

Components of the full-rate carriage unit 510 shown in FIG. 10 have approximately the same dimension in a perpendicular direction to the surface of the paper as those of the platen glass 150. The full-rate carriage unit 510 is moved in the direction of the arrow C in FIG. 9 at a velocity v by a driving unit, which is not shown. As the driving unit moves the full-rate carriage unit 510 in the direction of the arrow C, the full-rate carriage unit 510 can scan the entire surface of the object O.

The description of the units of the image-reading device 500 now continues, with reference once again to FIG. 9.

The half-rate carriage unit 120 has mirrors 141 and 142, and guides light from the full-rate carriage unit 510 to the focusing lens 130. The half-rate carriage unit 120 is driven by a driving unit(not shown) and moves in the same direction as the full-rate carriage unit 510 at half the velocity of the full-rate carriage unit 510 (i.e., v/2). The focusing lens 130 is disposed along a light path which connects the mirror 542 and the inline sensor 140, and images light from the object O at the position of the inline sensor 140. The inline sensor 140 is a receptor element such as a three-line color CCD (Charge Coupled Device) which divides and receives, for example, three colors of light, R (red), G (green), and B (blue), and performs photoelectric conversion of each color of light, generating and outputting image signals in accordance with the amount of light received. The operating unit 60 has a liquid crystal display or other display device, and a variety of buttons, displaying information for a user and accepting input instructions from the user.

Operation of the units described above is controlled by a control unit, which is not shown. The control unit XX has a computational device such as a CPU (Central Processing Unit) and various types of memory such as ROM (Read Only Memory) and RAM (Random Access Memory), and supplies instructions to the driving unit described above according to input instructions from the user, causing prescribed operations to be performed for reading images. The control unit generates image data by applying various image processes such as AD conversion, gamma conversion, and shading correction to image signals output by the inline sensor 140. The image signals output by the inline sensor 140 include image signals based on diffusely reflected light and image signals based on specularly reflected light (which, more accurately, includes diffusely reflected light). The control unit generates image data containing information on color, by applying prescribed computations to the former image signals. The control unit further generates image data containing information on texture by applying prescribed computations to the latter image signals. The control unit can thereby generate image data containing information on color and texture by superimposing the image data achieved from the former and latter image signals. The control unit executes a computational process which diminishes components equivalent to diffusely reflected light in the image signals from specularly reflected light (which, more accurately, contains diffusely reflected light), when generating this image data.

In the second exemplary embodiment, in the color reading mode, the object O is illuminated from two directions, and image data is generated which expresses the appearance (mainly the color) of the object O based on the diffusely reflected light from the object O. In the texture reading mode, the object O is constantly illuminated from one direction and image data is generated which expresses the appearance (mainly the texture) of the object O based on specularly reflected light from the object O. Accordingly, in the color reading mode, the color of the object can be read, and in the texture reading mode, the texture of the object can be read. If the color reading mode and the texture reading mode are used together, the color and the texture of the object can be read simultaneously.

By varying the orientation of the movable reflector 532 (a guiding unit) by the motor 536 (the driving unit), the movable reflector 532 can be used in both image-reading modes. Accordingly, when compared with a case in which, for example, specialized units are mounted for each of the two image-reading modes, the number of units can be reduced, since any configuration is simpler. Furthermore, since the light from the tubular light source 531 in the texture reading mode is converted to parallel light by the collimator lens 530 and emitted in the direction of the object O, the incident angle of the light beams with respect to the object become uniform, making it possible more quantitatively to generate specularly reflected light components by the fine shape of the surface of the object. The texture of the object can accordingly be read more accurately. The light (diffuse light) from the tubular light source 531 is condensed into parallel light, making it possible to ensure a sufficient amount of light.

C. Third Exemplary Embodiment

A third exemplary embodiment of the present invention is described next. The image-reading device according to the third exemplary embodiment differs from the image-reading device 500 of the first exemplary embodiment described above only in the configuration of the full-rate carriage unit. For this reason, only a configuration of the full-rate carriage unit is described below, while components which are the same as those of the second exemplary embodiment are assigned the same symbols, and description thereof is omitted.

Figure 14:
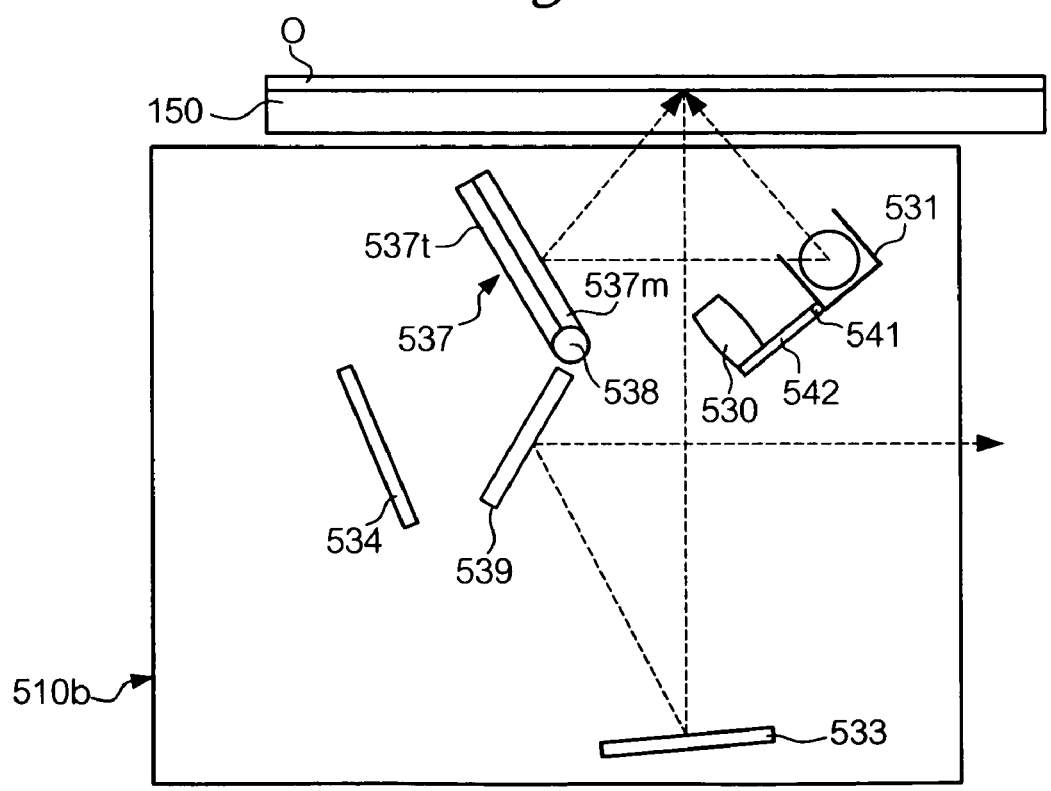
FIG. 14 is a view showing another configuration of the full-rate carriage unit according to a third exemplary embodiment of the present invention.
Figure 15:
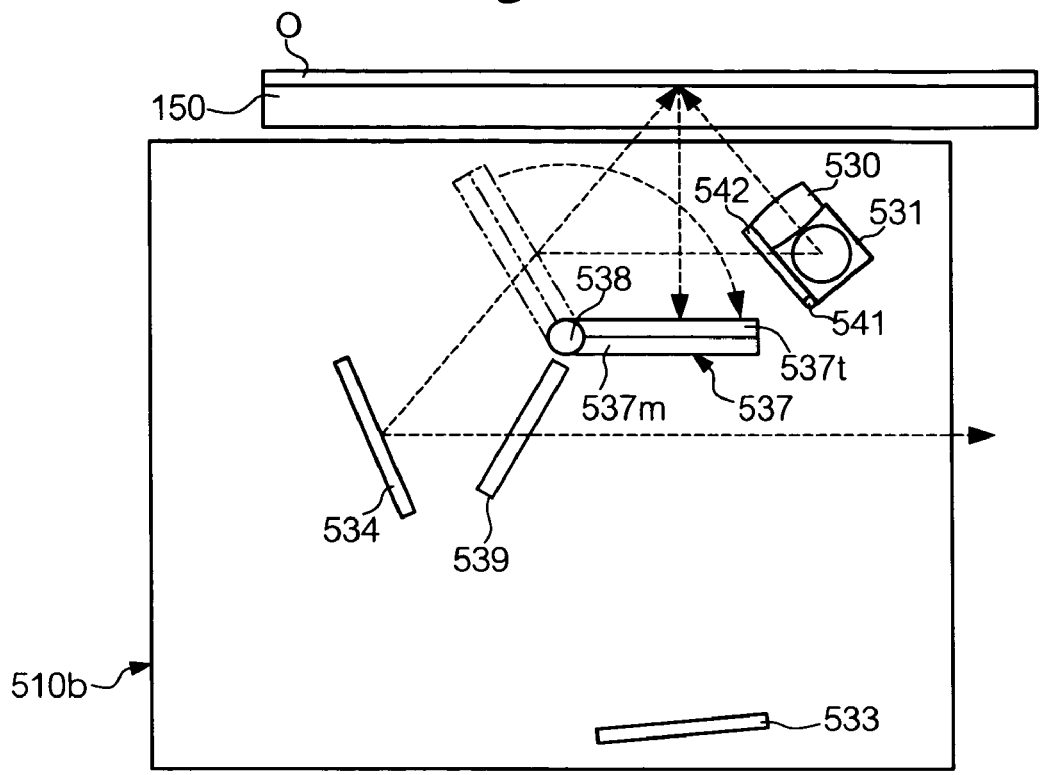
FIG. 15 is a view showing another configuration of the full-rate carriage unit according to the same exemplary embodiment.

FIG. 14 and FIG.15 are views showing configuartions of a full-rate carriage unit 510b in the exemplary embodiment. The full-rate carriage unit 510b has a movable reflector 537 in place of the movable reflector 532 of the second exemplary embodiment, and has a beam splitter 539. The movable reflector 537 is a flat optical member, is rotatable around a shaft 538 driven by the motor 536 (not shown), and can take the orientation shown in FIG. 14 and the orientation shown in FIG. 15. Like the movable reflecotr 532, the movable reflecotr 537 has a reflective surface 537m for reflecting light and an absorbing surface 537t for absorbing light.

The beam splitter 539 partially reflects and partially lets pass incident light. Due to its design, the higher the reflectance of light from one surface of the beam splitter 539 is set, the lower the transmittance of light becomes. In other words, the reflectance of incident light from the front side (one surface) is equal to or above a threshold value, and the transmittance is equal to or below a threshold value. (Note that the threshold values need not be the same.) Utilizing this property, in the color reading mode, diffusely reflected light coming from the object O via the mirror 533 is reflected at a reflectance equal to or higher than the threshold on the front side of the beam splitter 539 and is directed in the direction of the half-rate carriage unit 120. In contrast, in the texture reading mode, specularly reflected light coming from the object O via the mirror 534 is transmitted from the rear side to the front side of the beam splitter 539 at a transmittance equal to or lower than the threshold, and directed in the direction of the half-rate carriage unit 120. In general, specularly reflected light from the object O can be more intense than the dynamic range of diffusely reflected light by an order of several digits. Accordingly, when designing the beam splitter 539, the reflectance of the front side and the transmittance of the rear side should be set at appropriate values. The position of the beam splitter 539 is a position at which a light path (a first light path) along which light travels which has been diffusely reflected by the object O as shown by the dotted line in FIG. 14 overlaps a light path (a second light path) along which light travels which has been specularly reflected by the object O as shown by the dotted line in FIG. 15.

In the color reading mode when the collimator lens 530 is in the position shown in FIG. 14, the object O is illuminated with the diffuse light from the tubular light source 531. In the texture reading mode when the collimator lens 530 is in the position shown in FIG. 15, the light from the tubular light source 531 is transformed by the collimator 530 to a parallel light and is guided in the direction of the object O.

When the movable reflector 537 is in the position shown in FIG. 14 in the color reading mode, it reflects the light from the tubular light source 531 in the direction of the object O with the reflective surface 537m. At this time, the object O is also irradiated by light (diffuse light) from the tubular light source 531, with the result that the object O is irradiated from two directions at once. The diffusely reflected light from the object O is reflected by the mirror 533, reflected by the beam splitter 539, and then travels in the direction of the half-rate carriage unit 120. In other words, the orientation of the movable reflector 537 in the color reading mode is an orientation in which light from the tubular light source 531 is reflected in a direction toward the object O by the reflective surface 537m, and also in which the diffusely reflected light from the object O is directed toward the half-rate carriage unit 120 by being reflected by the mirror 533 and the beam splitter 539.

When the movable reflector 537 is in the position shown in FIG. 15 in the texture reading mode, the reflective surface 537m moves to a position at which light from the tubular light source 531 is not received, so the object O is irradiated only from the direction of the tubular light source 531 (i.e., from a constant direction) by parallel light. Accordingly, more specularly reflected components of light are generated by the fine texture of the surface of the object O, causing them to therefore express the texture of the object. The specularly reflected light is reflected by the mirror 534, passes through the beam splitter 539, and then travels in the direction of the half-rate carriage unit 120. Further, the absorbing surface 537t of the movable reflector 537 moves to a position at which it faces the object O, so the diffusely reflected light from the object O is absorbed by the absorbing surface 537t. Thus, the orientation of the movable reflector 537 in the texture reading mode is an orientation in which light from the tubular light source 531 is diffusely reflected by the object O and directed in the direction of the absorbing surface 537t, and also in which the specularly reflected light from the object O is directed toward the half-rate carriage unit 120 by the mirror 534.

Note that, as in the second exemplary embodiment, as regards the orientation of the movable reflector 537 and the positions of the various members, the length of the optical path of the light which is diffusely reflected by the object O until being received by the inline sensor 140 via the mirror 533 and the movable reflector 537, is equal to the length of the optical path of the light which is specularly reflected by the object O until being received by the inline sensor 140 via the mirror 534. Accordingly, even if the orientation of the movable reflector 537 changes in accordance with the image-reading mode, the focus position in the guiding unit does not change. The configuration makes it possible to receive diffusely reflected light and specularly reflected light at the same inline sensor 140 (a signal generating unit) without the necessity of adjusting the focal position at each time.

In the third exemplary embodiment, as in the second exemplary embodiment, in the color-reading mode, the color of the object can be read, and in the texture-reading mode, the texture of the object can be read. If the color reading mode and the texture reading mode are used in conjunction, the color and the texture of the object can be read simultaneously. By varying the orientation of the movable reflector 537 (a guiding unit) by the motor 536 (the driving unit), the movable reflector 537 can be used in both image-reading modes. Accordingly, when compared with a case in which, for example, specialized units are mounted for each of the two image-reading modes, the number of units can be reduced, since any configuration is simpler. Furthermore, since the light from the tubular light source 531 in the texture reading mode is -converted to parallel light by the collimator lens 530 and emitted in the direction of the object O, the incident angle of the light beams with respect to the object become uniform, making it possible more quantitatively to generate specularly reflected light components by the fine texture of the surface of the object. The texture of the object can accordingly be read more accurately. The light (diffuse light) from the tubular light source 531 is condensed into parallel light, making it possible to ensure a sufficient amount of light.

D. Modifications

The following modifications to the above first through third exemplary embodiments are possible.

(1) With the configuration of the full-rate carriage unit shown in FIG. 5 in the description of the first exemplary embodiment, the orientation (orientation) of the moving-mirror 115 is uniquely determined when the shaft 301 and the pins 302 and 303 are inserted in the guide grooves 401, 402, and 403, and the moving-mirror holder 117 is secured at a certain position. However, to determine the orientation of the surface (the reflective surface), it is sufficient if two lines on the surface are determined. Accordingly, it is sufficient if at least two pins are provided to a lateral surface of the moving-mirror 115 and at least two guide grooves in which those pins are inserted are provided to the casing member. Further, when varying the position of the moving-mirror 115, if the shaft 301 is moved along the scanning direction, the position of the moving-mirror 115 changes.

(2) In the first exemplary embodiment, the image-processing unit 50 generates color image data in a state in which a color image based on the first image signal and a monochrome image based on the second image signal are superimposed, but the following is also possible.

First, an image based on the second image signal may be a color image, and not a monochrome image. Since a monochrome image is represented with no colors, areas in shadow can be emphasized more, but even in color images, areas of shadow are darker and are thus recognizable as shadow areas, and therefore express texture.

Further, the image-processing unit 50 may be such that it on the one hand generates color image data based on the first image signal, and on the other hand generates monochrome image data based on the second image signal, associates the generated color image data and the monochrome image data and outputs each to the image-forming unit 20. In this case, the image-forming unit 20 should overlap and form on the recording sheet a color image using C, M, and Y-color toners based on the color image data, and a monochrome image using K-color toner based on the monochrome image data.

(3) In the first exemplary embodiment, the image-processing unit 50 reads a signal value of the second image signal from the image memory, converts this into a signal value which expresses a monochrome image (without color), and further multiplies the signal value by the coefficient C (0<C≦1), but it is also possible simply to add the signal value of the first image signal and the signal value of the second image signal, without using the coefficient C.

Instead of presetting the coefficient C, for example, to C=0.5, the operator may determine an appropriate coefficient C each time. For example, before forming an image on the recording sheet, the image-processing unit 50 sets the coefficient C to the value between 0.1 and 1, for example, in increments of 0.1, and displays a list of multiple images, based on image data generated using all these coefficients C, to the display of the operating unit 60 or to personal computers connected to the image-forming device 1 in a network. The more the coefficient C approaches 1, the more emphasized the shadows become, but at the same time color is lost, so the operator selects from among these multiple images an image considered to reproduce in the most balanced manner the texture and color of the object O as seen by the operator's eye. The image-processing unit 50 supplies this image data which expresses the image thus designated by the operator to the image-forming unit 20, and the image-forming unit 20 forms an image on the recording paper based on the image data.

(4) The first exemplary embodiment specifically discloses the case of the first incident angle of 45° and the case of the second incident angle of 65°, but the values of the first incident angle and the second incident angle are not limited thus. For example, the first incident angle need only be an angle at which an object with a uniform surface can be read favorably, approximately 45° being desirable, but within 1° to 2° from 45° also being possible. To further emphasize the texture of the object O, the second incident angle may be approximated to 70°, and to emphasize the color of the object O, the second incident angle may be approximated to 60°.

(5) In the first exemplary embodiment, the inline sensor 140, which is the signal generating unit, was described as multiple rows of CCD image sensors provided with an on-chip color filter, but the present invention is not limited to this configuration. For example, the signal generating unit may be a single row of image sensors in a configuration provided with a sliding or rotating color filter. With such a configuration, the inline sensor can be configured more cheaply, but increasing the number of colors which are read presents a problem of a concomitant increase in the number of times the reading operation is performed. The number of colors read by the inline sensor is not limited to three colors, and may be four or more colors. A higher number of colors makes it possible to estimate spectral reflectance more accurately, but when the amount of data in the generated image signals and the image-processing time are taken into consideration, around three to six colors is appropriate.

(6) In the first exemplary embodiment, a tandem-type image-forming unit was described which has four image-forming units, but a rotary-type image-forming unit is also possible. Further, a paper transporting belt may be provided in lieu of the intermediate image transferring belt, and images may be transferred directly to the recording paper from the photosensitive drum, and not from an intermediate image transferring body (the intermediate image transferring belt).

(7) Note also that, in the first exemplary embodiment, a case in which the present invention is used as an image-forming device was described, but such an aspect is not a limitation. For example, just as an image-reading device can be provided with a configuration equivalent to the image-reading unit of this exemplary embodiment, a certain effect can be achieved without providing the image-processing unit or the image-forming unit. In other words, the present invention can be specified as this kind of image-reading device.

(8) The following modifications are possible to the second exemplary embodiment.

Figure 12:
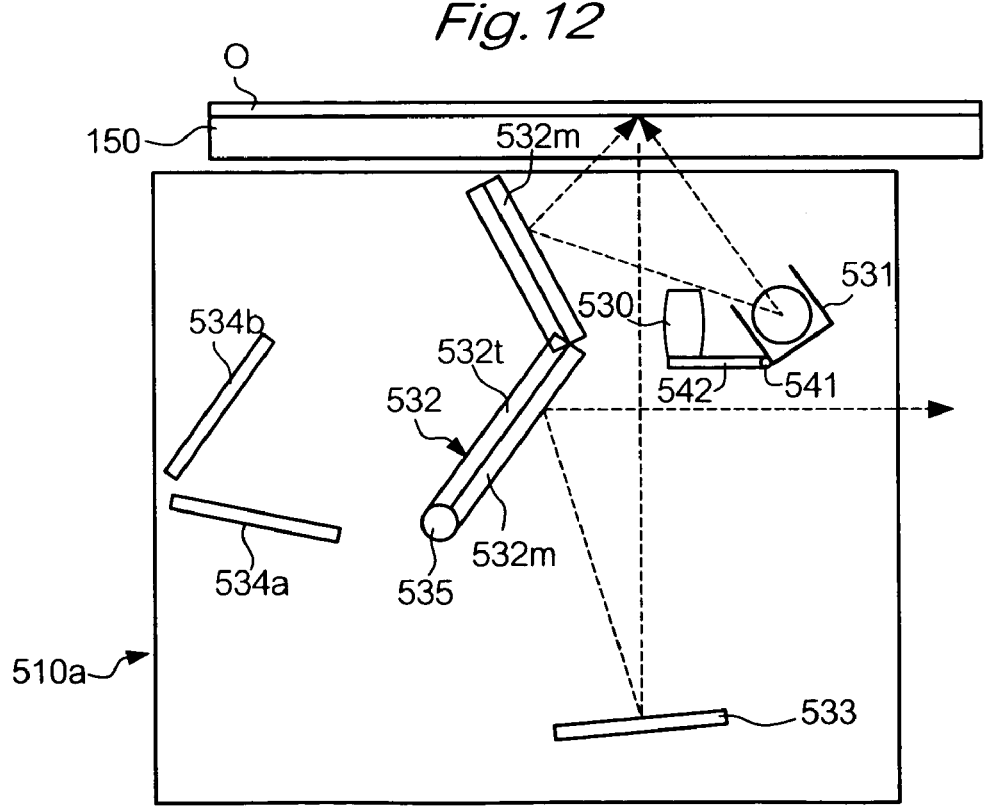
FIG. 12 is a view showing another configuration of the full-rate carriage unit according to a modification of the same exemplary embodiment.
Figure 13:
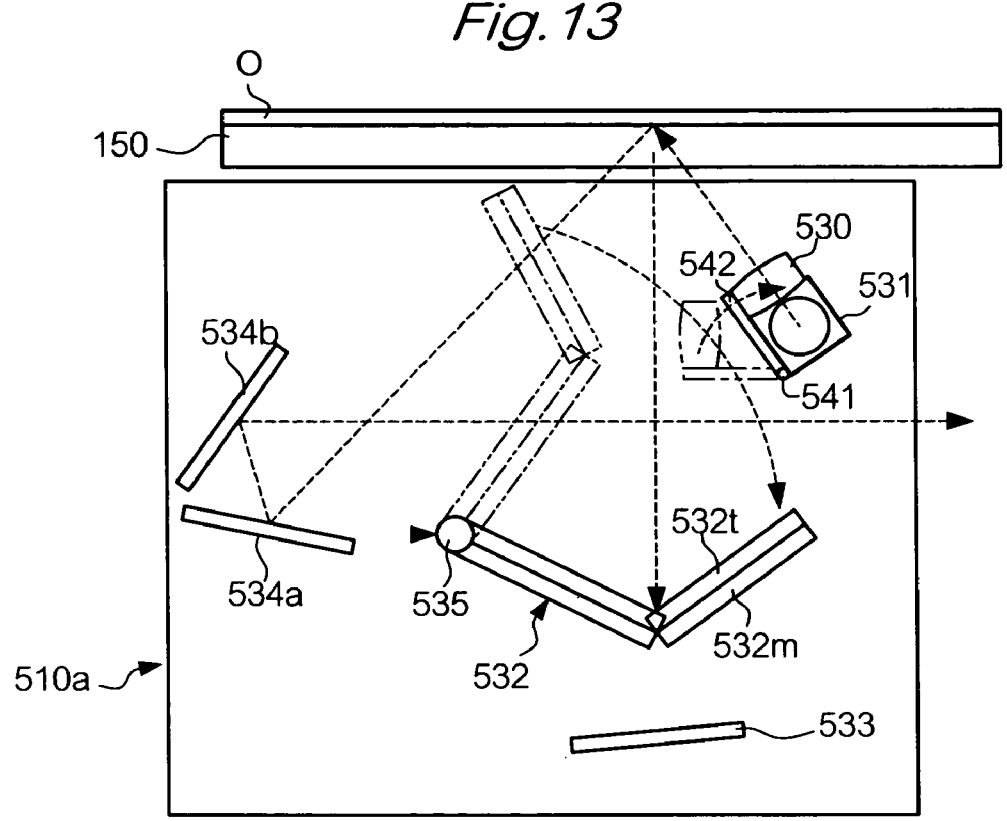
FIG. 13 is a view showing another configuration of the full-rate carriage unit according to a modification of the same exemplary embodiment.

FIG. 12 and FIG. 13 are views showing configurations of a full-rate carriage unit 510*a* according to a modification. FIG. 12 shows a configuration of the full-rate carriage unit 510*a* in the color reading mode and FIG. 13 shows a configuration of the full-rate carriage unit 510*a* in the texture reading mode. In FIG. 12 and FIG. 13, components which are the same as those of the first exemplary embodiment have the same symbols. The full-rate carriage unit 510*a* according to this modification has two mirrors 534*a* and 534*b* in lieu of the mirror 534. By provision of these two mirrors 534*a* and 534*b*, the number of reflections of the light which is diffusely reflected by the object O until being received by the inline sensor 140 via the mirror 533 and the movable reflector 532 and the number of reflections of light which is specularly reflected by the object O until being received by the inline sensor 140 via the mirrors 534*a* and 534*b* are both even numbers (twice). By matching the number of reflections of light in the color reading mode and the texture reading mode in this way to either an even number or to an odd number, the direction of the image in the reflected light in the sub-scanning direction in each case can be matched. In the first exemplary embodiment, the number of reflections in the color reading mode is two, while the number of reflections in the texture reading mode is one, which means the image directions of each do not match. In such a case, since the direction of the sub-scanning direction images imaged on the inline sensor do not match, so the order is inverted in the sub-scanning direction of the image which is imaged on the inline sensor which has three pixel rows of R, G, and B. Accordingly, the conditions for the process for matching the lines in the later-stage delay memory have to be changed, which may result in problems such as switching the processing circuit, or increased memory delay. This modification is convenient because such processes are not needed.

Figure 16:
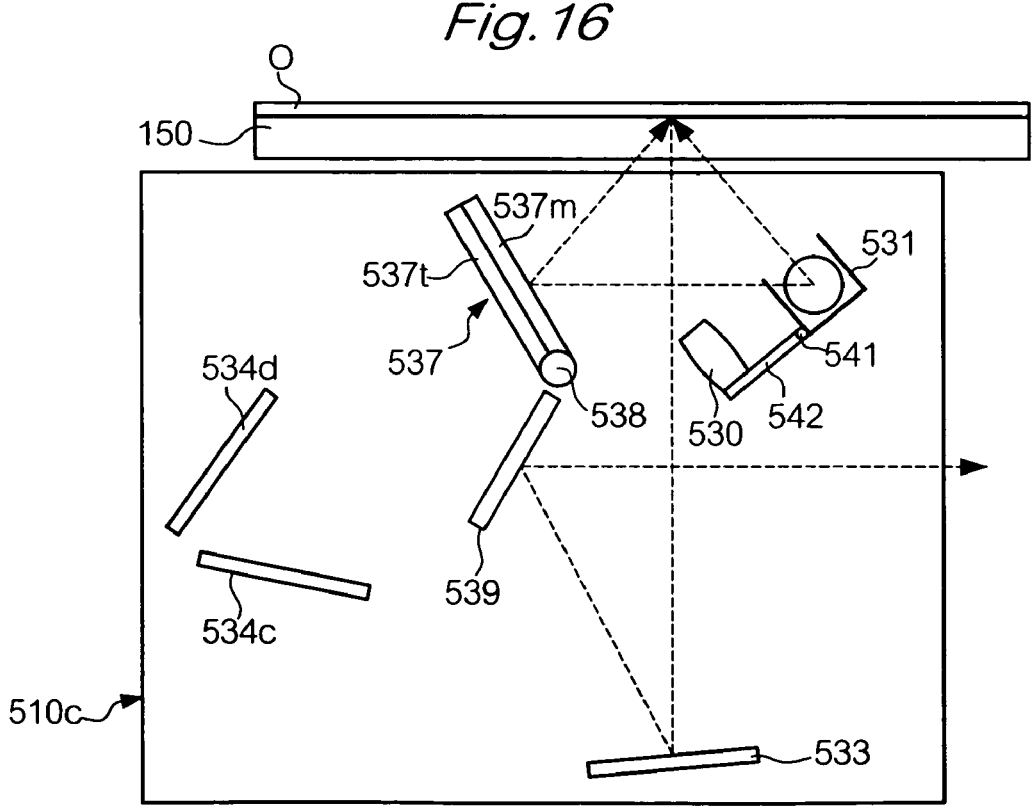
FIG. 16 is a view showing another configuration of the full-rate carriage unit according to a modification of the same exemplary embodiment.
Figure 17:
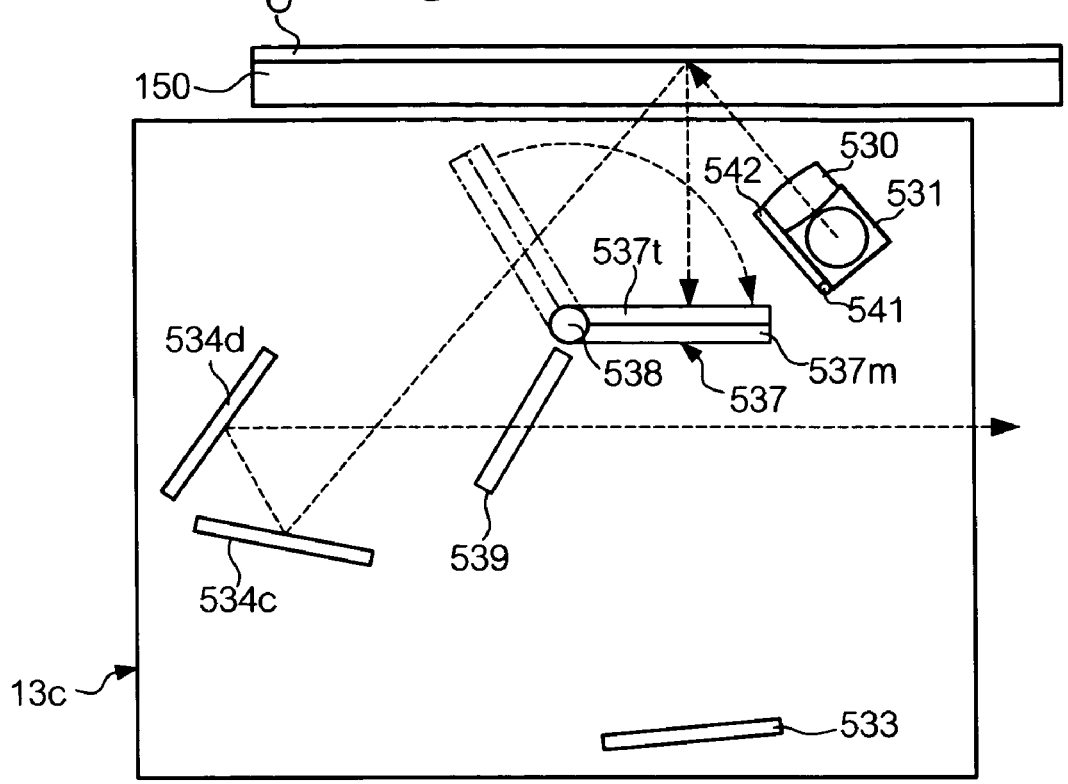
FIG. 17 is a view showing another configuration of the full-rate carriage unit according to a modification of the same exemplary embodiment.
Figure 18:
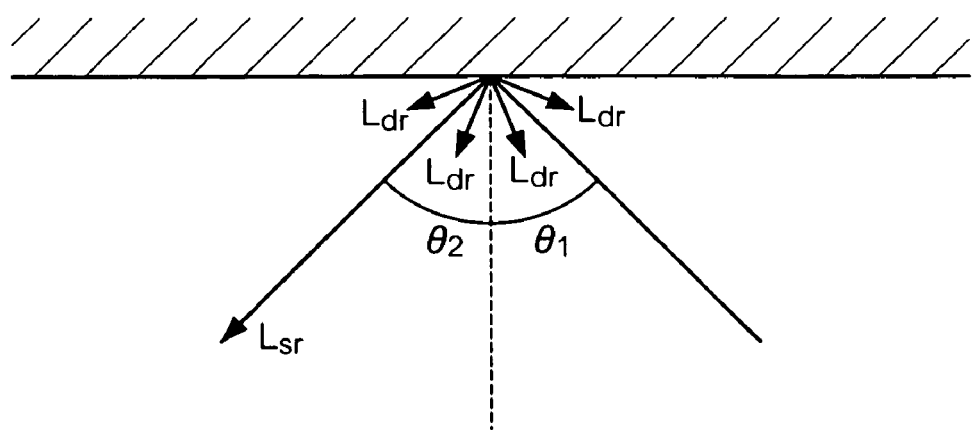
FIG. 18 is a conceptual view showing how light is reflected from an object.

(9) The following modification is possible of the third exemplary embodiment, based on the same concept as the modification of the second exemplary embodiment. FIGS. 16 and 17 are views showing configurations of a full-rate carriage unit 510*c* according to a modification of the third exemplary embodiment. FIG. 16 shows a configuration of the full-rate carriage unit 510*c* in the color reading mode and FIG. 17 shows a configuration of the full-rate carriage unit 510*c* in the texture reading mode. The full-rate carriage unit 510*c* has two mirrors 534*c* and 534*d* in lieu of the mirror 534. By provision of these two mirrors 534*c* and 534*d*, the number of reflections of the light which is diffusely reflected by the object O until being received by the inline sensor 140 via the mirror 533 and the beam splitter 539 and the number of reflections of light which is specularly reflected by the object O until being received by the inline sensor 140 via the mirrors 534*c* and 534*d* are both even numbers (twice). By matching the number of reflections of light in the color reading mode and the texture reading mode in this way to either an even number or to an odd number, the direction of the image in the reflected light in each case can be matched.

(10) Note that in the second exemplary embodiment and the third exemplary embodiment, the orientation of the movable reflector is varied according to the image-reading mode by rotating it around a shaft. If only the orientation of the movable reflector is changed, then control is simpler and preferable. However, it is possible to vary the position of the movable reflector and not just the orientation of the movable reflector in accordance with circumstances of the interior space in the image-reading device, and it is possible also to vary the orientation and position at the same time. Furthermore, the collimator lens is not limited in the shape of that shown, but any known collimator lens may be applied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device, comprising:
   a light source;
   a first guiding unit that guides the light from the light source to an object at prescribed incident angles including a first incident angle and a second incident angle, the first guiding unit including a reflection unit and a moving unit, the reflection unit including a reflective mirror and a unit that varies the orientation of the reflective mirror, and the moving unit performing a function of moving the reflective mirror of the reflection unit in a first direction;
   a signal generating unit that receives light and that generates an image signal based on the received light;
   a second guiding unit that guides the light reflected from the object to the signal generating unit; and
   a control unit that controls the first guiding unit to guide the light from the light source to the object at least two different incident angles including the first incident angle and the second incident angle, and controls the signal generating unit to generate image signals for the at least two different incident angles, the control unit causing the first guiding unit to control the reflection unit to vary the orientation of the reflective mirror so that the light from the light source illuminates a fixed position on the object while the reflective mirror is moved in the first direction,
   wherein the device operates in a first mode for obtaining the colors of an object and a second mode for obtaining the texture of an object.

2. The device according to claim 1,
   wherein the reflection unit is rotatable around an axis, the axis being parallel to the reflective mirror and perpendicular to the first direction,
   and wherein the first guiding unit further includes:
   a first driving unit that varies the orientation of the reflective mirror by rotating the reflection unit around the axis; and
   a second driving unit that moves the reflective mirror in the first direction,
   and wherein the control unit controls the first driving unit to vary the orientation of the reflective mirror, and controls the moving unit and the second driving unit to move the reflective mirror in the first direction.

3. The device according to claim 1,
   wherein the reflection unit includes:
   at least two shafts or pins, which are provided on a lateral surface of the reflective mirror, and
   at least two guide grooves which extend in different directions, and in which the shafts or pins are inserted,
   and wherein the control unit controls the first driving unit to vary the orientation and the position of the reflective mirror, by moving the shafts or the pins inserted in the guide grooves in the first direction.

4. The device according to claim 1, wherein the first incident angle is about 45 degrees and the second incident angle is about 60 to 70 degrees.

5. The device according to claim 1, wherein the signal generating unit generates first image signals based on the received light when the light from the light source is guided to the object at the first incident angle, and generates second image signals based on the received light when the light from the light source is guided to the object at the second incident angle, the device further comprising:
   an image data generating unit that generates image data based on the first image signals and the second image signals; and
   a unit that forms a toner image on a recording sheet based on the generated image data.

6. The device according to claim 5, wherein the image data generating unit generates the image data by adding a product of the second image signals and a prescribed coefficient to the first image signal.

7. The device according to claim 6, wherein the coefficient is larger than 0 and less than or equal to 1.

8. A device comprising:
   a light source;
   a first optical member including a first reflective surface, a second reflective surface and an absorbing surface for absorbing light;
   a second optical member that transforms an incident light to a parallel light;
   a signal generating unit that receives light and generates an image signal based on the received light;
   a switching unit that switches an operation mode of the device to one of a first image-input mode and a second image-input mode;
   a third optical member that guides the diffusely reflected light from the object to the second reflective surface of the first optical member;
   a fourth optical member that guides an incident light to the signal generating unit;
   a first driving unit that moves the second optical member, while in the first image-input mode, to a position where the second optical member guides the parallel light to the object, and while in the second image-input mode, to a position where the second optical member does not guide the parallel light to the object; and
   a second driving unit that varies a position or orientation of the first optical member, while in the first image-input mode, to a position or orientation where the first optical member reflects by the first reflective surface the light from the light source that directly illuminates the object, guides by the third optical member the diffusely reflected light from the object to the second reflective surface, and reflects by the second reflective surface the light so that the light is guided to the image generating unit, and while in the second image-input mode, to a position or orientation where the first optical member guides the diffusely reflected light from the object to the absorbing surface and guides by the fourth optical member the incident light to the signal generator.

9. The device according to claim 8, wherein the second optical member is a collimator lens.

10. The device according to claim 8,
wherein the signal generating unit generates image signals based on the diffusely reflected light from the object in the first image-input mode, and generates image signals based on the specularly reflected light from the object in the second image-input mode,
and wherein the signal generating unit generates color information indicating colors of the object based on the generated image signals in the first image-input mode, and generates texture information expressing texture of the object based on the generated image signals in the second image-input mode.

11. The device according to claim 8, wherein the length of the light path of the diffusely reflected light from the object guided by the first optical member to the signal generating unit is equal to the length of the light path of the specularly reflected light from the object guided by the second optical member to the signal generating unit.

12. The device according to claim 8, wherein the number of the reflections along the light path of the diffusely reflected light from the object guided by the first optical member to the signal generating unit and the number of the reflections along the light path of the specularly reflected light from the object guided by the second optical member to the signal generating unit are either both odd numbers or both even numbers.

13. A device comprising:
a light source;
a beam splitter including a reflective surface and a back surface of a reflective surface, the reflective surface reflecting light when the beam splitter is illuminated from the reflective surface, whereas light goes through the beam splitter when the beam splitter is illuminated from the back surface;
a first optical member including a reflective surface and an absorbing surface for absorbing light;
a first driving unit that varies the orientation and the position of the first optical member;
a second optical member that transforms an incident light to a parallel light;
a second driving unit that varies the orientation and the position of the second optical member;
a third optical member that guides light diffusely reflected from the object to the reflective surface of the beam splitter; and
a fourth optical member that guides an incident light to the signal generating unit,
wherein, in a first image-input mode, the first driving unit is configured to vary the orientation and the position of the first optical member such that the light from the light source directly illuminates the object, and the light reflected by the reflective surface of the first optical member is guided to the object at a first incident angle, whereas light diffusely reflected from the object is reflected by the third optical member and is further reflected by the reflective surface of the beam splitter in the direction of the image generating unit; and
in a second image-input mode, the second driving unit is configured to place the second optical member between the light source and the object so that all the light from the light source is transformed to a parallel light and illuminates only the object at the first incident angle, and to control the first driving unit to place the first optical member in a position such that it does not block specularly reflected light from the object, and the specularly reflected light is further reflected by the fourth optical member and goes through the beam splitter in the direction of the image generating unit, whereas the diffusely reflected light from the object is absorbed by the absorbing surface of the first optical member.

* * * * *